Patented Nov. 13, 1934

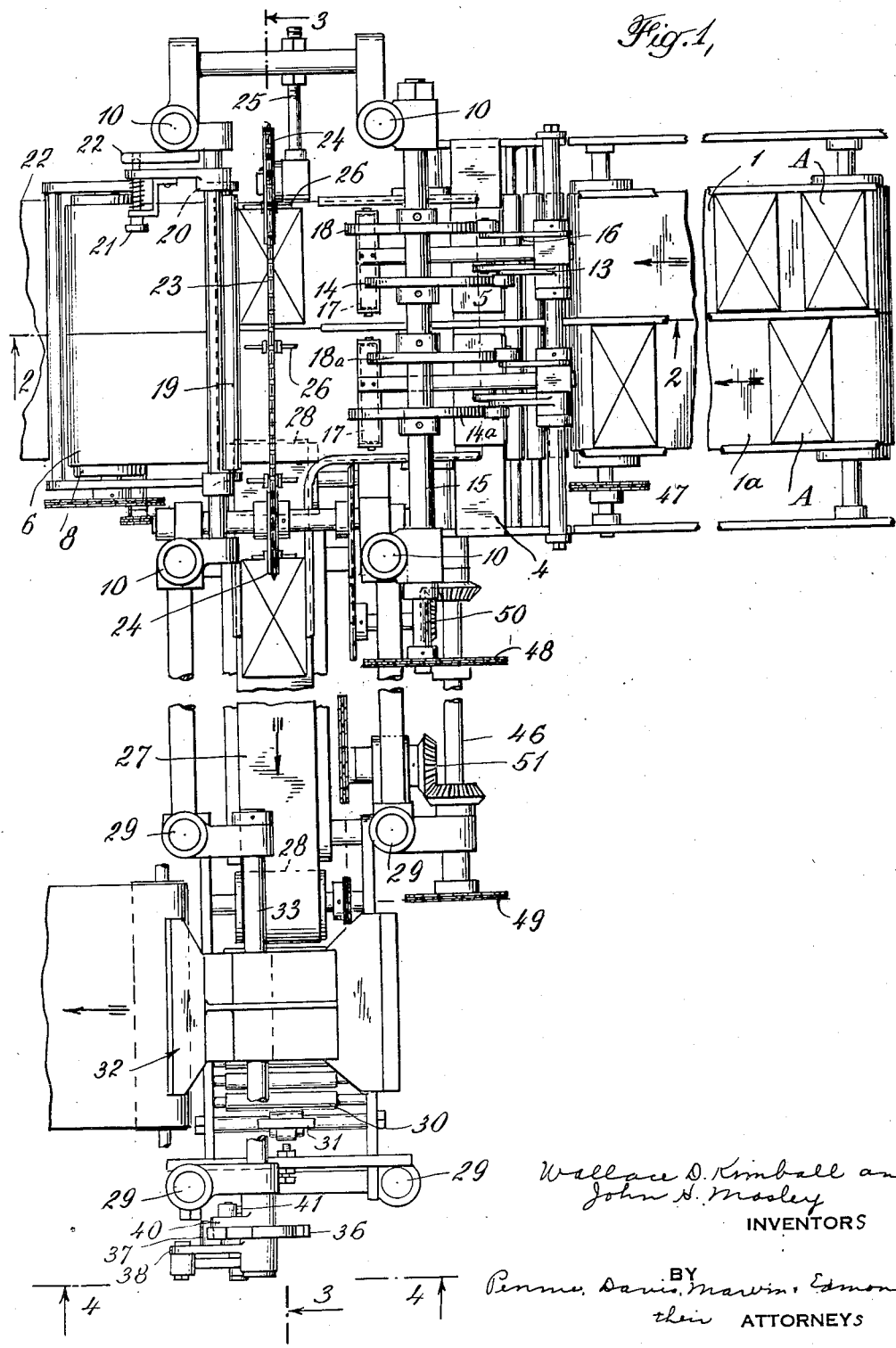

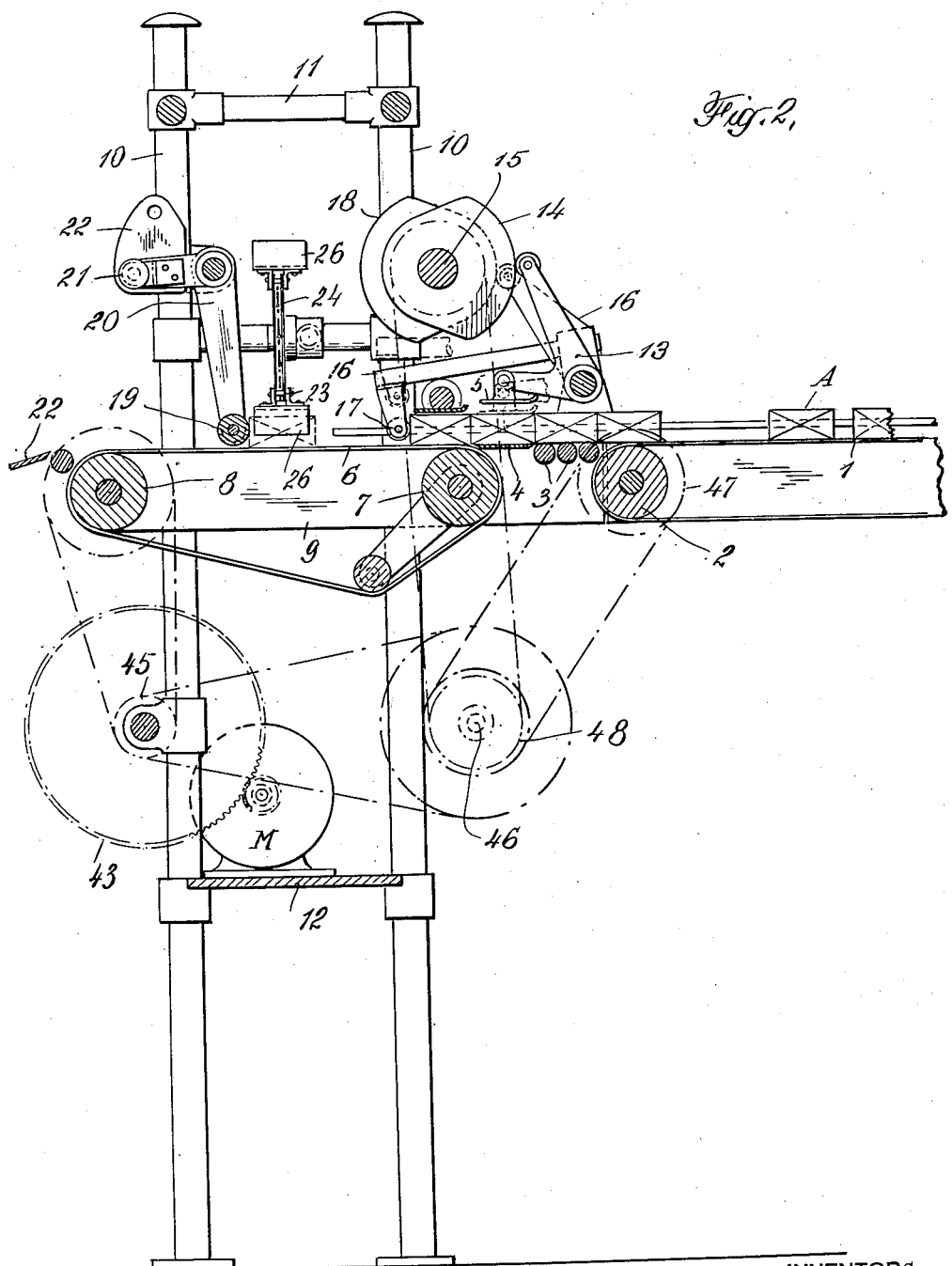

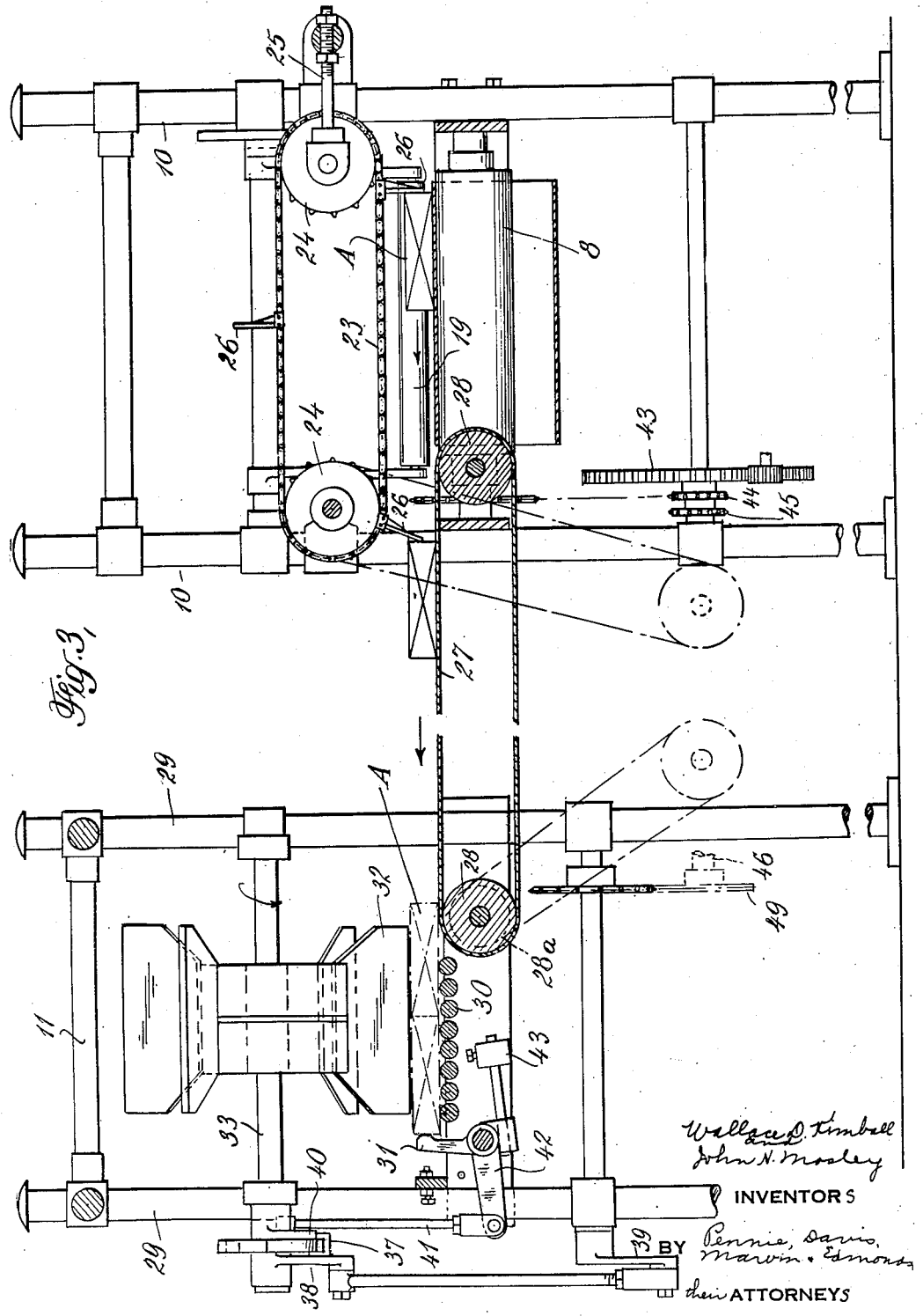

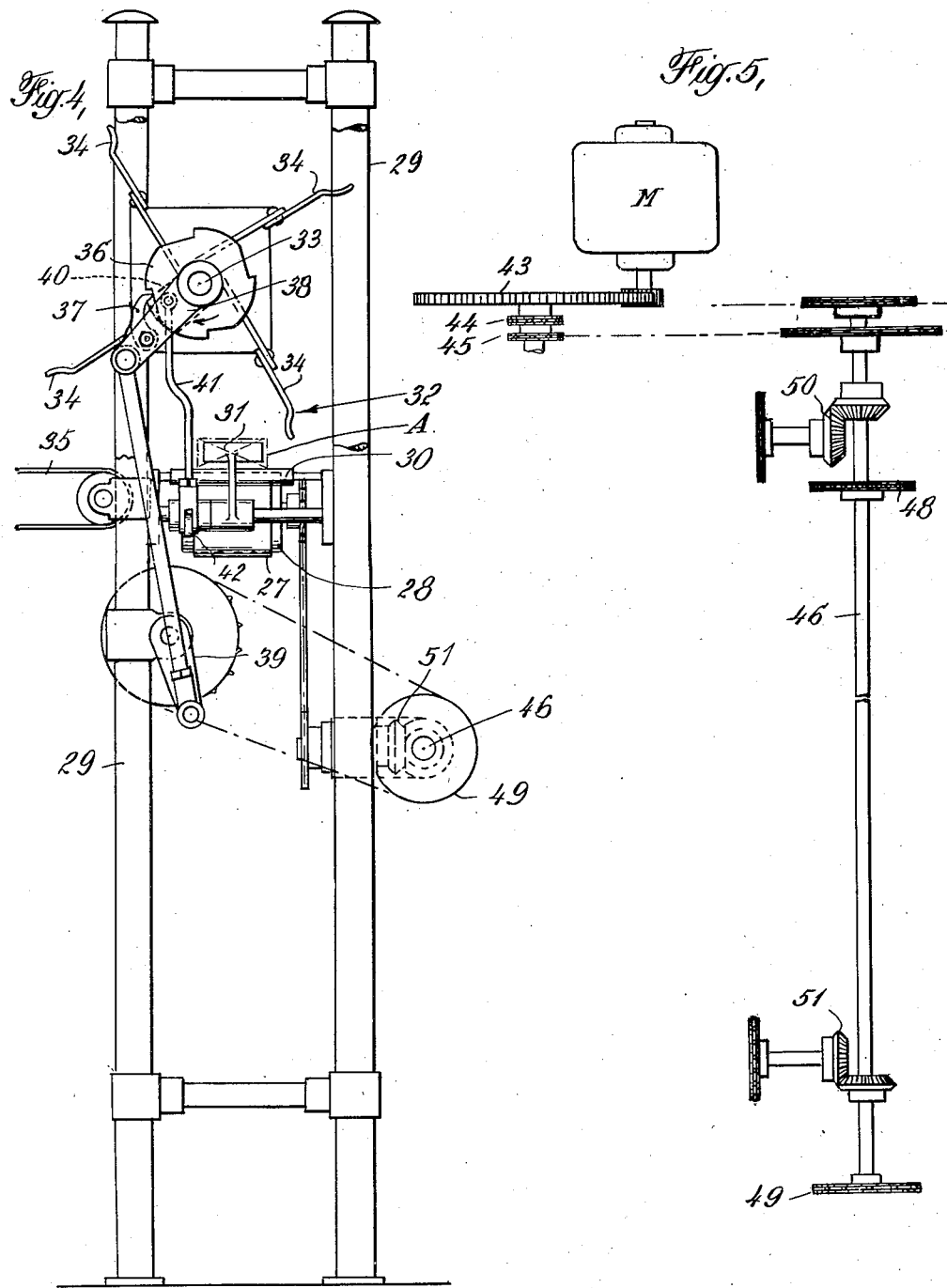

1,980,411

UNITED STATES PATENT OFFICE 1,980,411

ARTICLE-COLLECTING DEVICE

Wallace D. Kimball and John H. Mosley, Jackson Heights, N. Y., assignors, by mesne assignments, to Standard-Knapp Corporation, Long Island City, N. Y., a corporation of New York Application December 11, 1930, Serial No. 501,560

6 Claims. (Cl. 198—32)

This invention relates to article-handling apparatus and has for its object to provide a device of this character particularly adapted for use in connection with automatic packaging machines for insuring the delivery to the packaging machines of the articles to be packaged, properly positioned and in the desired order.

Manufactured articles such as cakes of soap, packages of cereal and the like, are usually delivered from the wrapping machines, presses, or whatever machine performs the last operation on the finished article, by belt conveyors which convey the packages to the department where they are packed in containers for shipment. The articles are usually delivered to the conveyor belts in closely adjacent ranks but with frequent gaps in the ranks due to the temporary stoppage of the wrapping or other machines, the removal of defective articles by inspectors, and from various other causes. Where the goods are to be packed by hand in the packing cases, these gaps in the ranks are of no significance, for in hand-packing the articles are removed from the belts by hand. But when the articles are to be packed with automatic machinery it is desirable, if not essential, that the articles be delivered to the packaging machine with uniformity and regularity, and at the desired speed of operation of the packaging machine.

The article-handling mechanism of the present invention is designed primarily to be interposed between the conveyor belts upon which the manufactured articles are to be brought to the packing room, and the automatic packing machines, and serves to collect the articles from the conveyor belts however they may be arranged, and deliver them to the packaging machine in the desired orderly succession.

A further object of the invention is to provide a machine of this character which is entirely automatic in its operation, requiring no attention whatsoever from the packing room attendants, which is of low manufacturing cost, which requires but little power to operate, and which is substantially foolproof in its operation.

In the accompanying drawings we have disclosed a preferred embodiment of our machine, and in the said drawings Figure 1 is a plan view of the machine;

Fig. 2 is a transverse vertical section on line 2—2 of Fig. 1;

Fig. 3 is a transverse longitudinal section on line 3—3 of Fig. 1;

Fig. 4 is a side view partly in section on line 4—4 of Fig. 1; and

Fig. 5 is a detail view showing the driving connections for the various parts of the machine.

Referring to the drawings, particularly to Figs. 1 and 2, 1, 1 indicate the conveyor belts leading from the wrapping machines or other source of the article to be packed. As here shown the belts are two in number, but one belt may be used, or more than two if circumstances make it desirable. The articles, illustrated at A, may be, and usually are, irregularly disposed upon the belts as indicated.

The belts at the delivery end pass over pulleys 2 continuously driven through a belt system which will be later described, from the driving motor M of the machine. Immediately adjacent the belt-supporting pulleys 2 are a series of rollers 3 having their upper faces in the same plane as the upper reach of the belts 1, 1a and serving as a receiving table for the articles delivered by the belts.

Immediately adjacent the rollers 3 is a short platform 4 with its surface also in the plane of the belts 1, 1a and rollers 3, and cooperating with the platform 4 is an article-holding clamp 5 adapted to grip the article resting on the table 4 and hold it for a predetermined interval against movement, thereby stopping the forward movement of the articles. At the intervals of stoppage the belts slip under the row of articles held by the clamp 5. Immediately adjacent the table 4 and in line with the belts 1, 1a is a short feed belt 6. This belt is trained over supporting pulleys 7 and 8 and is continuously driven from the motor M through intermediate driving mechanism which will be later described, at a speed greater than the speed of the belts 1, 1a.

The rollers 3, table 4, and belt-supporting pulleys 7 and 8 are mounted on the transverse members 9 of the machine frame. This frame may be of any suitable construction, but is preferably of the construction shown and comprises four vertical posts 10 connected above the plane of the belt 6 by horizontal members 11 and at a point below the belt by a shelf 12 which serves as a support for the motor M. The transverse frame members 9 are rigidly secured to the vertical frame members 10 and the various parts of the mechanism at the end of the machine adjacent the delivery belts 2 are supported on some portion of this rigid framework.

The clamp 5 cooperates with the table 4 and is carried by a bellcrank 13 supported for rocking movement in a suitable bracket carried by the adjacent frame members 9. The bellcrank 13 is operated by a cam 14 fixed to a shaft 15 supported for continuous rotation in brackets carried by the adjacent posts 10. The cam 14 is shaped so as to hold the clamp 5 elevated away from the article during substantially half the complete revolution of the shaft 15 and to allow the clamp to grip the article during substantially the other half of the complete rotation.

Also mounted on the shaft 15 is a second bellcrank 16 whose horizontal arm projects forwardly over the belt 6 and is provided with a downwardly projecting bracket carrying a roller 17 adapted when the arm 16 is lowered, to project into the path of travel of the articles advanced by the belt 1, and when elevated, to allow the articles to move forward. The bellcrank 16 is operated from a cam 18 attached to the shaft 15 and of the same shape as the cam 14 but oppositely arranged so as to lower the roller 17 when the clamp 5 is elevated, and vice versa. The clamp 5 and roller 17 thus form an escapement which permits one article at a time to be detached from the line of articles advanced by the belt 1 and carried forward by the belt 6 to a position against a stop roller 19 supported by a swinging bracket 20 carried by the adjacent frame post 10.

A similar arrangement of cams and bellcranks is provided for the belt 1a, as shown in Fig. 1, the cams 14a and 18a being, however, staggered with respect to the position of the cams 14 and 18, respectively, whereby a single article will be released in the line advanced by the belt 1a during the interval that the articles on the belt 1 are held.

The stop roller 19 is long enough to extend across the path of travel of the articles delivered by both the belts 1 and 1a. In fact, the stop roller is just slightly longer than the belt 6 is wide, whereby it serves as a lateral guide for the articles during their advancement in a direction transverse to the path of movement of the belt 6. In the normal operation of the machine the stop roller 19 is positioned to engage the articles advanced by the belt to prevent their further movement under the influence of the belt 6. The bracket 20 is provided with an adjusting handle 21 whereby the stop roller may be swung out of the path of movement of the articles and a latch is provided for holding the bracket 20 in its two positions of adjustment, this latch consisting of a plate 22 having two holes registering with the stem of the handle 21 when the bracket is in its proper position of adjustment, the handle 21 being mounted for axial movement on the bracket for this purpose, as more particularly disclosed in Fig. 1.

When the roller 19 is shifted out of the path of movement of the articles the latter will be delivered by the belt 6 out of the machine onto a chute 22 or other suitable delivery conveyor. The purpose of this arrangement is to permit the articles to be temporarily diverted from their normal passage through the machine in the event it becomes necessary to shut down the packing machine to which the articles are normally delivered, or for any other purpose. An additional packaging machine may be arranged to receive the articles from the chute 22 or they may be taken therefrom for hand packing.

In the normal operation of the machine the articles stopped by the roller 19 are moved off the belt 6 in a direction transverse to its path of movement. The mechanism for so shifting the articles comprises a sprocket chain 23 overlying the belt 6 and supported for continuous operation on sprocket wheels 24 suitably mounted on brackets attached to the frame post 10. The shaft of one of the sprockets is preferably provided with an adjustable connection 25 between its shaft bearings and supporting bracket, whereby the sprocket may be maintained taut. The other sprocket 24 is driven continuously through a connection from the motor M. The sprocket chain 23 is provided with flights 26, here shown as three in number, positioned to engage the end of one of the articles resting on the belt 6 and in engagement with the stop roller 19, and shift the article transversely off the belt 6 and onto a second belt 27 mounted on horizontal pulleys 28 with their axes in the same plane as the pulleys 7, 8, but at right angles thereto, as illustrated more particularly in Fig. 3 of the drawings.

The pulley 28 which is adjacent the belt 6 slightly underlies the belt 6 so that the belts 6 and 27 form substantially a continuous surface with just sufficient space between them to allow free movement of the parts. The positions of the flights 26 and the sprocket wheels 24 are such that when each article engages stop roller 19 one of the flights 26 will immediately engage it and shift it laterally along the roller 19 and onto the belt 27 which carries the article laterally away from the belt 6 in the same path of travel as effected by the flights 26. By this mechanism the articles which enter the machine in two rows are shifted transversely to a single row in definitely spaced relation.

The belt 27 leads to a second unit of the machine supported on a frame made up of vertical posts 29 similar to the posts 10 and cross members 11 sufficient in number to provide a rigid framework upon which the operating devices are supported. The belt 27 is carried at its far end by a pulley 28a supported for rotation in the side members of the second unit frame, and continuously driven from the motor M by suitable driving connections which will be later described. Immediately beyond the pulley 28a is a roller table 30 upon which the articles carried by the belt 27 are delivered. A pivoted stop 31 is provided adjacent the roller table positioned to be engaged by the articles as advanced by the belt 27, and this stop serves to control the movement of an article ejector in the form of a paddle wheel 32 attached to the shaft 33 suitably mounted in brackets on the machine frame.

As shown more particularly in Fig. 4 the paddle wheel comprises four flights 34 equally spaced around the center of rotation and with their ends shaped and positioned to engage the last two articles of the row held against movement by the stop 31 and shift such articles onto the adjacent conveyor 35, which may be the feed belt of the packing machine.

The rotation of the paddle wheel 32 is controlled by the adjustable stop 31 in such manner that the paddle wheel is operated only when there are two articles in engagement with the stop. The mechanism for so operating the paddle wheel comprises a ratchet 36 attached to the shaft on which the paddle wheel is mounted, said ratchet having four teeth to correspond in number with the paddles. Cooperating with the ratchet is a driving pawl 37 carried by a rock arm 38 mounted for rotation on the shaft of the paddle wheel and oscillated through an angle of 90 degrees by means of a continuously driven crank 39 suitably supported on the machine frame beneath the plane of the belt 27.

Also mounted for rocking movement on the shaft of the paddle wheel is an arm 40 shown in dotted lines in Fig. 4. This arm is just slightly longer than the radius of the ratchet 36 and the end of the arm lies immediately adjacent the pawl 37 which is somewhat wider than the ratchet 36, whereby when the arm 40 is shifted upwardly from its position shown in Fig. 4 through a slight angle, its periphery will bridge the gap between two adjacent teeth of the ratchet 36 and thereby prevent the pawl 37 from engaging the teeth, thus allowing the paddle wheel to remain idle until the arm 40 is lowered by the pressure of the package against the stop 31.

The stop will be operated to lower the arm only when there are two packages in the path of movement of the paddles. The arm 40 is normally held in its elevated position, which renders the ratchet inoperative, by means of a link 41 whose lower end is connected to an arm 42 fixed to the shaft of the stop 31. A counterweight 43 projecting in the opposite direction from the arm 42 is also fixedly attached to the shaft of the stop and the counterweight is sufficiently large to overbalance the weight of the arm 40, link 41 and arm 42 and hold the arm 40 in its elevated position, and also hold the stop in its position to be engaged and shifted laterally by the advancing packages, when the second package is shifted onto the roller table. The counterweight is adjustable on its supporting arm to permit the stop mechanism to be accurately counterbalanced so that it will be operated by a very light pressure, for example, by the movement of a box of popcorn weighing but a small fraction of a pound, and advancing only through its frictional engagement with the belt 27. The belt 27 extends but a slight distance under the flight of the paddle wheel so that by the time the package previously delivered to the roller table is pushed against the stop 31 there will be but a small area of engagement between the belt and the second package. The mechanism may, however, be adjusted so that even this slight driving engagement would be sufficient to release the pawl and permit it to operate the driving ratchet of the paddle wheel, or the mechanism may be adjusted so that it requires the pressure of a third article to release the pawl 37. The operation of the machine will not be affected by such an adjustment except that the two articles will be advanced by the paddle wheel only when a third article is ready for delivery to the next flight of the paddle wheel.

By either arrangement each paddle of the paddle wheel, whenever it is operated, will deliver two packages simultaneously to the feed conveyor of the packaging machine or other point of delivery, quite irrespective of any irregularity in the operation of the feed belts 1 and 1a and the arrangement of the packages thereon.

The two articles fed at one operation by each flight of the paddle wheel will be the two articles successively delivered into the path of movement of the flights 26 of the chain 23, and these two packages may come one from one belt and one from the other, or both from either belt, depending upon the continuity of the packages on the respective belts.

The various parts of the machine may be driven in timed relation by any suitable driving connection. The driving connections shown in the drawings have proven satisfactory in practice and for convenience of illustration have been shown in Fig. 5 in their relative positions on the machine frame but entirely detached therefrom. The motor M constitutes the source of power which supplies the machine through a master gear 43 meshing with the pinion of the motor. This master gear is attached to a short shaft supported in suitable brackets on the posts 10 in a position beneath the pulley 8 and attached to the shaft are sprockets 44, 45. The sprocket 44 is connected through a suitable sprocket chain to a sprocket wheel on the shaft of the pulley 8 to thereby drive the belt 6 continuously.

The sprocket 45 is similarly connected to a sprocket wheel of larger diameter attached to a shaft 46 which extends in parallelism with the belt 27 from one frame unit to the other and supported for continuous rotation in suitable brackets carried by the vertical posts of the respective frame units. The belts 1 and 1a are driven from this shaft by means of a sprocket wheel 47 connected to the shaft of the pulley 2.

Also carried by the shaft 46 is a sprocket 48 through which the cam shaft 15 is operated and at its extreme end the shaft 46 is provided with a third sprocket 49 for operating the crank 39. The shaft 46 is also provided with a beveled gear 50 through which the sprocket chain 23 is driven, and a second beveled gear 51 for operating, through a suitable chain and sprocket connection, the feed belt 27.

It will be understood that the machine selected for illustration, wherein the articles from two incoming lines of belts are to be delivered to a single packaging machine, is but one embodiment of the invention. As the capacity of the packing machine is greater in proportion to the rapidity with which the articles are brought into the packing room, the machine may be readily modified for packing articles from three or more belts and delivering them in one, two or more unbroken rows to the packing machine or other point of delivery. It will also be obvious that the machine may be otherwise modified without departing from the spirit of the invention or going beyond the scope of the appended claims.

I claim:

1. In an article collecting mechanism, means for advancing articles in a plurality of rows in irregular succession, means for arranging said articles in a single row, means for advancing the single row transversely to the line of movement of the first-mentioned rows, intermittently actuated means for advancing a predetermined number of articles from the end of said row, and means for operating said intermittently actuated means only when said predetermined number of articles are within the range of said means.

2. In an article collecting mechanism, means for advancing articles in a plurality of rows in irregular succession, an escapement for each row for regulating the advance of articles to the end of the row, means for arresting the movement of the articles to form a single row, and means in timed relation with the escapement for shifting articles in said row.

3. In an article collecting mechanism, means for advancing articles in a plurality of rows in irregular succession, an escapement for each row for regulating the advance of articles to the end of the row, means for arresting the movement of the articles to form a single row, means in timed relation with the escapement for shifting articles in said row, and means for rearranging said articles in a plurality of rows each having the same number and arrangement of articles.

4. In an article collecting mechanism, means for advancing articles in a plurality of rows in irregular succession, an escapement for each row for regulating the advance of articles to the end of the row, means for arresting the movement of the articles to form a single row, means for advancing the single row transversely to the line of movement of the first mentioned rows, and means for periodically removing a predetermined number of articles from the end of said single row and advancing them in a plurality of rows out of the machine.

5. In an article collecting mechanism, means for advancing articles in a plurality of rows in irregular succession, an escapement for each row for regulating the advance of articles to the end of the row, means for arresting the movement of the articles to form a single row, means for advancing the single row transversely to the line of movement of the first-mentioned rows, a conveyor extending in a transverse direction away from said single row, an intermittently operated member adapted to engage a predetermined number of articles at the end of the single row and transfer them to said conveyor, and means for operating said member only when said predetermined number of articles is within the range of said member.

6. In an article collecting machine, a plurality of conveyors for receiving the articles to be collected in irregular succession, an escapement for each conveyor for effecting the intermittent delivery of articles from said conveyors in timed relation, means beyond the escapement for arresting the movement of the articles on said conveyors to form them into a single row, and another conveyor operating in timed relation with said escapements for shifting articles in said single row.

WALLACE D. KIMBALL.
JOHN H. MOSLEY.